United States Patent [19]

Hopper

[11] Patent Number: 5,010,454
[45] Date of Patent: Apr. 23, 1991

[54] PORTABLE LIGHT ASSEMBLY FOR AN AUTOMOBILE

[76] Inventor: Steven R. Hopper, 1596 "A" Coronado Ave., San Diego, Calif. 92154

[21] Appl. No.: 378,652

[22] Filed: Jul. 12, 1989

[51] Int. Cl.$^5$ ............................................. B60Q 1/00
[52] U.S. Cl. ....................................... 362/61; 362/183; 362/184; 362/191
[58] Field of Search .................. 342/20, 61, 80, 74, 342/183, 190, 191, 184, 208, 227, 249, 250, 251, 194, 234; 200/60

[56] References Cited

U.S. PATENT DOCUMENTS

| | | | |
|---|---|---|---|
| 1,984,401 | 12/1934 | Desimone | 362/191 |
| 2,861,174 | 11/1958 | Talbot | 362/228 |
| 3,096,941 | 7/1963 | Miller | 362/61 |
| 3,233,092 | 2/1966 | Umholtz | 362/183 |
| 3,825,740 | 7/1974 | Friedman et al. | 362/183 |
| 4,001,803 | 11/1977 | Lombardo | 362/20 |
| 4,321,657 | 3/1982 | Hoi | 362/228 |
| 4,357,648 | 11/1982 | Nelson | 362/183 |
| 4,463,283 | 7/1984 | Penney et al. | 362/20 |
| 4,535,391 | 8/1985 | Hsiao | 362/183 |
| 4,538,217 | 8/1985 | Ewing et al. | 362/427 |
| 4,605,993 | 8/1986 | Zelina | 362/183 |
| 4,607,207 | 8/1986 | Bruneau | 362/194 |
| 4,691,157 | 9/1987 | McDermott | 362/183 |
| 4,740,872 | 11/1988 | Chou | 362/183 |
| 4,825,345 | 4/1989 | Stevens | 362/61 |

FOREIGN PATENT DOCUMENTS 2172097 9/1986 United Kingdom ................ 362/194

*Primary Examiner*—Stephen F. Husar
*Assistant Examiner*—D. M. Cox
*Attorney, Agent, or Firm*—Andsel Group, Inc.

[57] ABSTRACT

A portable light assembly for an automobile having a flashlight and a signal lamp. The flashlight has an inverted U-shaped handle whose bottom ends are pivotally attached to a rechargable battery base unit. The lamp housing itself is pivotally mounted between the upright members of the handle at a point intermediate its height. The signal lamp has a rechargeable battery base unit and the bottom ends of an inverted U-shaped handle are pivotally secured thereto. A combination recharging and storage housing detachably receives both of the respective rechargeable battery base units. An electrical circuit connects the battery of an automobile through the ignition switch to terminals on the exterior surface of the rear wall of the combination recharging and battery storage housing. The flashlight and signal lamp each have their own L.E.D. indicator bulb mounted on their rechargeable battery base units that are illuminated when the rechargeable batteries therein are being recharged.

4 Claims, 2 Drawing Sheets

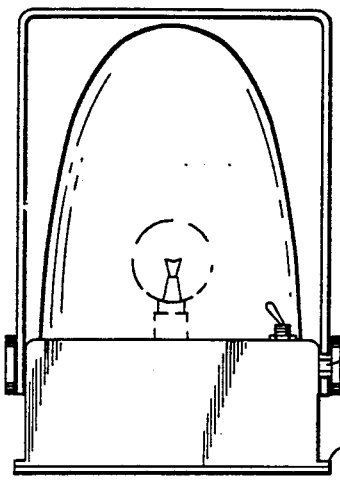
FIG. 6
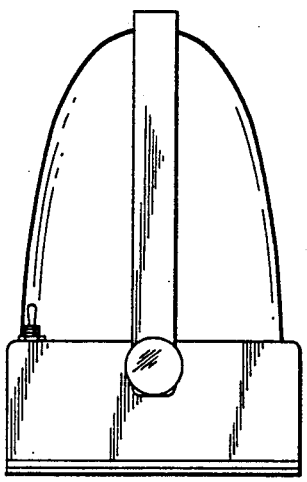
FIG. 7
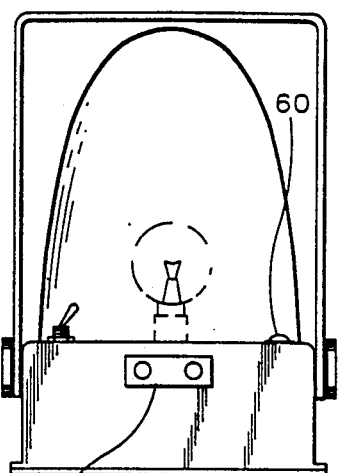
FIG. 8
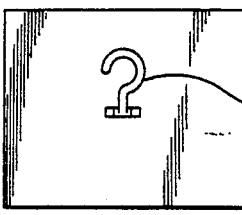
FIG. 6A
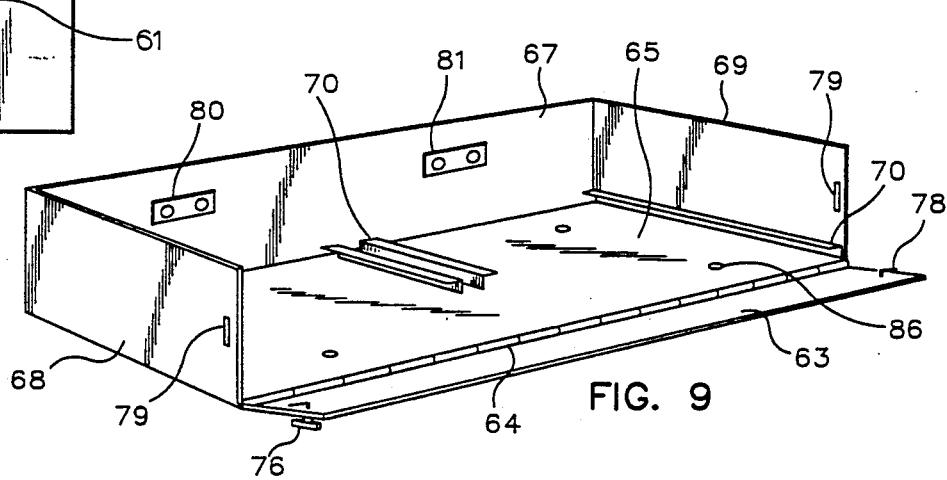
FIG. 9
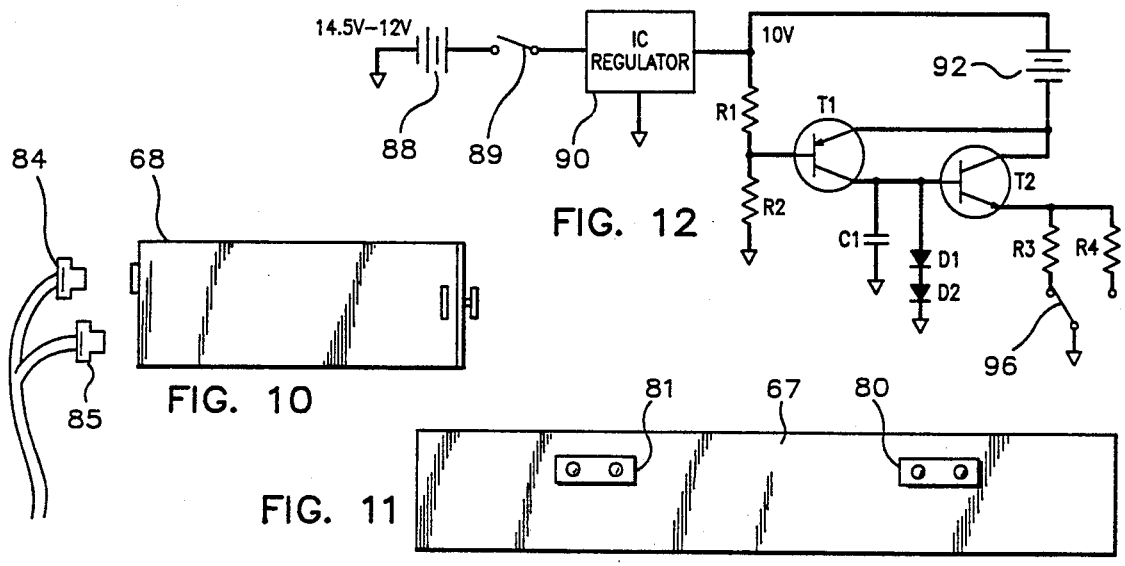
FIG. 10
FIG. 12
FIG. 11

PORTABLE LIGHT ASSEMBLY FOR AN AUTOMOBILE

BACKGROUND OF THE INVENTION

The invention relates to a light assembly and more specifically to a portable light assembly that would be installed in an automobile.

Motorists know that having a light, such as a flashlight, in an automobile is a good idea. Should trouble arise after sundown, a light source is needed to signal for help or to work on the vehicle.

The light sources currently available include common battery powered flashlights and sealed beamed lights. Also available are lights which are powered from the cigarette lighter outlet. Cigarette lighter powered units are limited by the length of wiring available with the unit and if the vehicle battery is discharged, the light is useless. Even having a long length of wiring is not as good as having a self contained light assembly. Battery powered lighting is preferable because of the high mobility provided. The trouble with batteries is, unless monitored, the batteries can lose power and fail when most needed.

When a motorist is disabled and stopped along a roadside there is need for warning approaching vehicles. Flares are common for truckers and reflective signs are used by both truckers and motorists as a way of warning those approaching the disabled vehicle. The problem here is the flares are not commonly available and flares can be dangerous as a fire hazard.

From the many prior art portable battery operated lights using rechargable batteries, probably the most pertinent prior is the device described in U.S. Pat. No. 4,605,993, Zelina. This single white light unit is removably encased in a receptacle containing the battery charger operable from the house power line. A similar device incorporating two light fixtures is described in U.S. Pat. No. 4,535,391, Meng-Chang-Hsiao. The two lights are mounted on a single case containing a commercial power operated battery charger. A hand carried flash lamp using rechargable batteries powered by an extension cord plugged into the vehicles cigarette lighter receptacle is shown in U.S. Pat. No. 4,357,648. A portable battery operated dual lamp assembly is described in U.S. Pat. No. 2,861,174, where one lamp is used for illumination and the second light is operated as an emergency warning light.

It is an object of the invention to provide a novel portable light assembly that has both a flashlight and a signal lamp that can be conveniently carried in an automobile.

It is also an object of the invention to provide a portable light assembly in which the flashlight and signal lamp each have their own rechargable battery base unit that is detachably received in a combination recharging and storage housing. An electrical circuit connects the battery of the vehicle through the ignition switch to the terminals on the rear wall surface of the combination recharging and storage housing so that they may be recharged from the battery of the vehicle.

It is another object of the invention to provide a novel portable light assembly wherein the flashlight and signal lamp each have an L.E.D. indicator lamp mounted on their respective rechargable battery base units that will indicate when the batteries therein are being recharged.

It is an additional object of the invention to provide a novel portable light assembly for an automobile that is economical to manufacture and market.

It is a further object of the invention to provide a novel portable light assembly for an automobile that can be easily installed by a do-it-yourselfer.

SUMMARY OF THE INVENTION

Applicant's novel portable light assembly provides two types of rechargable light sources for automobile owners. One lamp is a high intensity sealed beam light, similar to a flashlight beam, which can be directed at any angle desired and locked in place. The second lamp is an amber lamp which can be operated either in the constant on position or flashing intermittently. The intermittent flash operation is desirable when setting up a road side distress signal, the flashing amber light being a universal signal for caution.

Both lamps are mounted onto rechargable battery base units. These battery base units are the power source for the lamps as well as providing a stable, weighted base when they are placed upon a surface. The wide base allows for hands-free use of the directional sealed beamed lamp. When placed where desired, the lamps on the invention will not tip over or be blown over by the wind or passing motorists and the handle aids in providing tip proof stability.

Both of the lamps are housed in an open top box-shaped

The Flashlight unit and the signal lamp unit are detachably mounted in a combination recharging and storage housing. It is typically mounted in the trunk of an automobile or behind the seat in a truck. Thus the combination recharging and storage housing not only provides electrical connection for recharging the battery pack of the lamp units, but further provides a structure for storing the units when not in use. Because the combination recharging and storage housing is securely mounted to the frame work of a car trunk, the lamps are held solidly in position when not in use.

An electrical circuit is provided that has its one end connected to the battery of the automobile and it passes through the ignition switch and has its other end connected to the terminals located on the rear wall surface of the combination recharging and storage housing. Accordingly, there is no current passing from the automobile battery to the respective rechargable battery base units unless the ignition switch has been turned to the on position. At this point, the L.E.D. indicator lamps mounted on the respective rechargable battery base units will glow indicating that the batteries therein are being charged. Since auto battery voltage ranges from 14.4 volts to 12.0 volts, this is regulated by an IC regulator to provide a stable 10 volts for the charger circuitry. The charger circuitry provides the constant current recommended for recharging NiCad cells. An automatic voltage limiting circuit is employed to prevent overcharging which can lead to thermal runaway. The constant current circuitry also contains a quick recharge and trickle charge mode.

DESCRIPTION OF THE DRAWINGS

FIG. 6 is a front elevation view of the signal lamp unit;

FIG. 6A is a bottom plan view of the signal lamp unit.

FIG. 7 is a side elevation view of the signal lamp unit;

FIG. 8 is a rear elevation view of the signal lamp unit;

FIG. 9 is a front perspective view of the combination recharging and storage housing with its front wall pivoted downwardly;

FIG. 10 is a side elevation view of the combination recharging and storage housing showing the manner in which the electrical connections are made thereto;

FIG. 11 is a rear elevation of the combination recharging and storage housing; and FIG. 12 is a schematic illustration of the electrical circuit for applicant's novel portable light housing for an automobile.

DESCRIPTION OF THE PREFERRED EMBODIMENT

Figure 1:
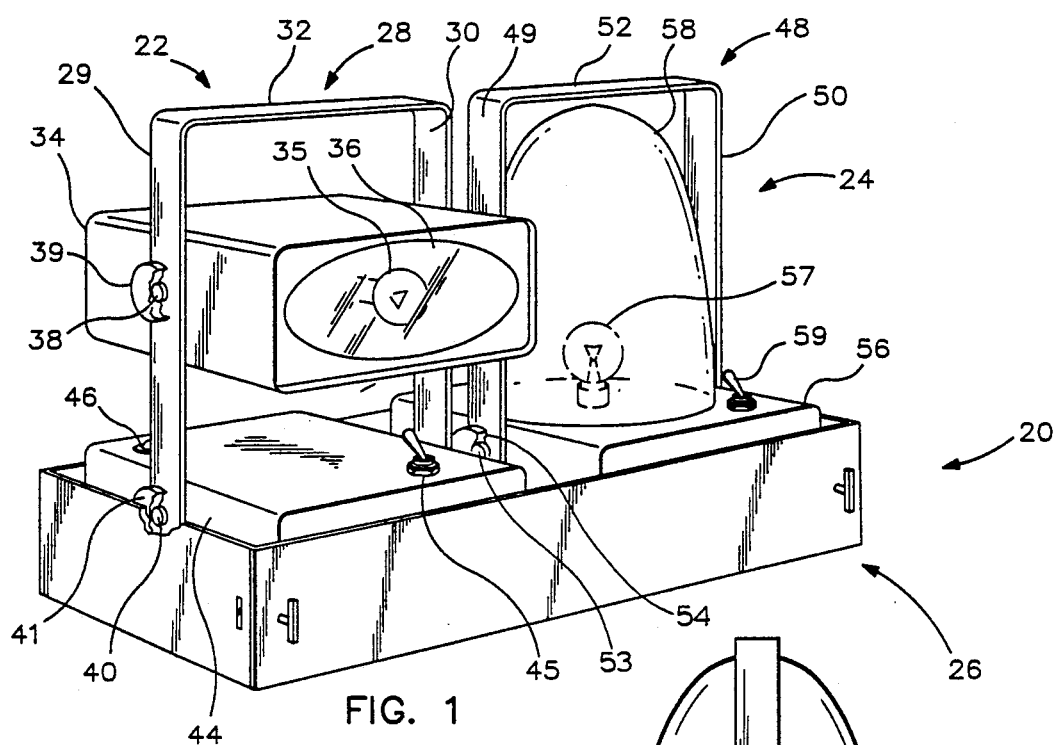
FIG. 1 is a front perspective view of applicant's novel portable light assembly for an automobile.
Figure 2:
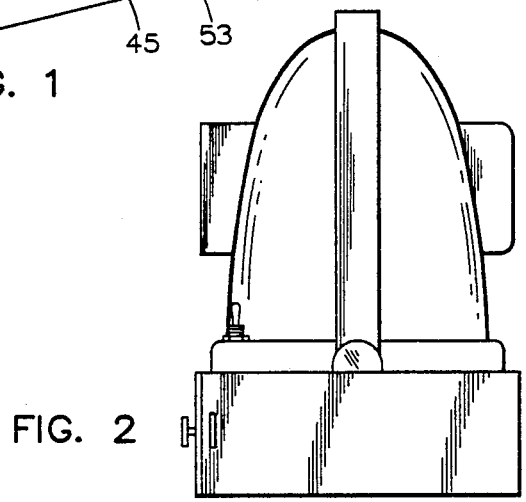
FIG. 2 is a side elevation view of FIG. 1.
Figure 3:
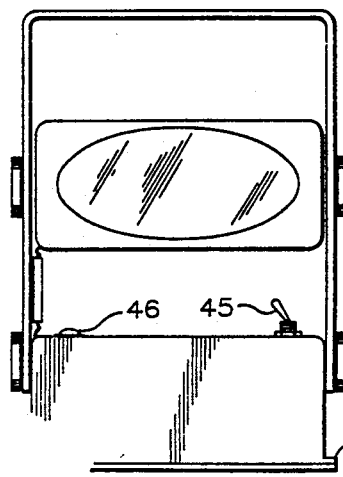
FIG. 3 is a front elevation view of the flashlight unit.
Figure 4:
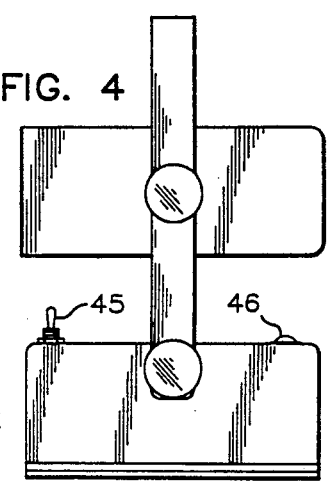
FIG. 4 is a side elevation view of the flashlight unit.
Figure 5:
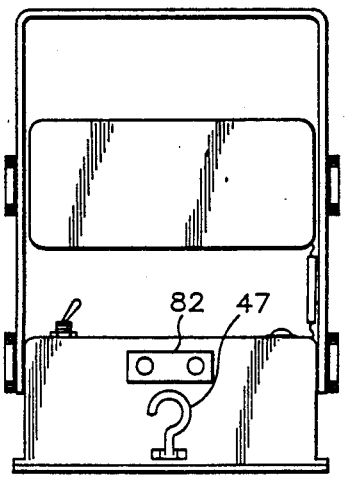
FIG. 5 is a rear elevation view of the the flashlight unit.

Applicant's novel portable light assembly for an automobile will now be described by referring to FIGS. 1-12 of the drawings. The portable light assembly is generally designated numeral 20.

The basic components of portable light assembly 20 are flashlight 22, signal lamp 24 and combination recharging and storage housing 26.

Flashlight 22 has an inverted U-shaped handle 28 having laterally spaced upright members 29 and 30 that are connected at their top end by a cross member 32. Lamp housing 34 has a high intensity bulb 35 positioned behind lens 36 in its front wall. A pair of bolts 38 having knurled heads 39 that are journaled in the respective upright members 29 and 30 and pivotally support lamp housing 34 so that it may be adjusted to various vertical angles. The bottom ends of upright members 29 and 30 have bolts 40 having knurled heads thereon. They are journaled in the respective upright members and also secured to the opposite sides of rechargable battery base units 44. A switch 45 is used to turn high intensity bulb 35 on. The rechargable batteries would be within the housing of rechargable base unit 44. An L.E.D. indicator lamp 46, when operating indicates that the batteries therein are being charged. A C-hook 47 is pivotally mounted in a recess formed in the rear wall of rechargable battery base unit 44. C-hook 47 can be used to hang unit 44.

Signal lamp 24 has an inverted U-shaped handle 48 having laterally spaced upright members 49 and 50 that are connected at their top ends by cross member 52. Bolts 53 having knurled heads 54 are journaled in the bottom ends of the respective upright members and also secured to rechargable battery base unit 56. A bulb 57 extends upwardly from its top surface and it is covered by a bubble-type protective lens 58. A switch 59 is provided for turning bulb 57 on. An L.E.D. indicator lamp 60, when operating indicates that the batteries therein are being recharged. A C-hook 61 is pivotally mounted in a recess formed in the bottom wall of signal lamp 24. C-hook 61 can be used to hang unit 24.

Referring to FIGS. 9-11, combination recharging and storage housing 26 will now be described. It has front wall pivotally secured by piano type hinge 64 to bottom wall 65. Also upstanding from bottom wall 65 is rear wall 67 and side walls 68 and 69. Guide rails 70 are attached to the inner surface of side walls 68 and 69 and also to the top surface of bottom wall 65 to detachably receive the laterally extending flanges 72 and 74 of the respective flashlight 22 and signal lamp 24. Twist-lock latch members 76 are pivotally mounted in front wall 63 and secure front wall 63 in its upright position when fingers 78 have been turned laterally through slots 79 in the respective side walls 68 and 69. Electrical connection terminals 80 and 81 meet with the respective electrical connection terminals 82 and 83 of the flashlight and signal lamp. Male plugs 84 and 85 are attached to the respective electrical connection terminals 80 and 81.

A plurality of fastener apertures 86 are formed in bottom wall 65 for securing the unit to structure in the automobile.

A schematic illustration of the electrical circuit for recharging the flashlight and signal lamp of applicant's novel portable light assembly is illustrated in FIG. 12. Automobile battery 88 is connected to ignition switch 89. Since the auto battery voltage ranges from 14.4 volts to 12.0 volts, the voltage is regulated by IC regulator 90 to provide a stable 10 volts for the charger circuitry. The charger circuitry provides the constant current recommended for recharging NiCad cells 92. Resistors R1 and R2 are in series to ground. Transistor T1 is connected from NiCad cells 92 to capacitor C1 and to ground. Diodes D1 and D2 are also connected in series to ground. Transistor T2 is connected to parallel resistors R3 and R4 which in turn are connected to switch 96. When switch 96 closes the circuit through R3, the batteries will be quickly recharged. When switch 96 closes the circuit through resistor R4, the trickle charge mode would be activated. The automatic voltage limiting circuit is employed to prevent overcharging which could lead to thermal runaway.

The drawings as shown and thusly described represent the preferred embodiment of the invention. It would be obvious to one skilled in the art that various changes and modifications, simple or complex, could be made to the preferred embodiment which would alter the appearance but not the scope, spirit and intention of the invention. It is the intention of the inventor to preclude the occurance of any such emulations in spirit or design to the preferred embodiment through the following claims.

What is claimed is:

1. A portable flashlight assembly for an automobile comprising:
    a flashlight having a rechargable battery base unit;
    a signal lamp having a rechargable battery base unit;
    a combination recharging and storage housing;
    means for detachably securing said respective rechargable battery base units to said combination recharging and storage housing so that they may be recharged from the battery of an automobile; and
    said flashlight comprising:
        an inverted U-shaped handle having a pair of laterally spaced upright members each having a top end and a bottom end, said respective top ends being connected by a cross member, the bottom ends of said upright members being pivotally secured to the rechargable battery base unit of said flashlight;
        a lamp housing having laterally spaced side walls and a front wall having a lens mounted therein, a high intensity bulb removably mounted in said lamp housing behind said lens; and
        means for pivotally supporting said lamp housing about a horizontal axis between said spaced upright members at a height intermediate said top and bottom ends.

2. A portable light assembly as recited in claim 1 further comprising an L.E.D. indicator bulb mounted on the rechargable battery base unit of said flashlight, said L.E.D. indicator bulb being electrically connected to a source of electrical power so it may indicate when the rechargable batteries are being recharged.

3. A portable light assembly as recited in claim 2 further comprising a C-hook pivotally mounted in a recess formed in the rear wall of the rechargable battery base unit of said flashlight.

4. A portable light assembly for an automobile comprising:
- a flashlight having a rechargeable battery base unit;
- a signal lamp having a rechargeable battery base unit;
- a combination recharging and storage housing;
- a means for detachably securing said respective rechargeable battery base units to said combination recharging and storage housing so that they may be recharged from the battery of an automobile;
- said flashlight comprising:
- an inverted U-shaped handle having a pair of laterally spaced upright members each having a top end and a bottom end, said respective top ends being connected by a cross member, the bottom ends of said upright members being pivotally secured to the rechargeable battery base unit of said flashlight;
- a lamp housing having laterally spaced sidewalls and a front wall having a lens mounted therein, a high intensity bulb removably mounted in said lamp housing behind said lens; and
- means for pivotally supporting said lamp housing about a horizontal axis between said spaced upright members at a height intermediate said top and bottom ends;
- said signal lamp further comprising an inverted U-Shaped handle having a pair of laterally spaced upright members each having a top end and a bottom end, said respective top ends being connected by a cross member, the bottom ends of said upright members being pivotally secured to the rechargeable battery base unit of said signal lamp;
- an L.E.D. indicator bulb mounted on the rechargeable battery base unit of said flashlight, said L.E.D. indicator bulb being electrically connected to a source of electrical power so it may indicate when the rechargeable batteries are being charged;
- an L.E.D. indicator bulb mounted on the rechargeable battery base unit of said signal lamp, said L.E.D. indicator bulb being electrically connected to a source of electrical power so it may indicate when the rechargeable batteries are being charged;
- a C-hook pivotally mounted in a recess formed in the rear wall of the rechargeable battery base unit of said flashlight;
- a C-hook pivotally mounted in a recess formed in the bottom wall of the rechargeable battery base unit of said signal light; and
- said portable light assembly being in combination with an automobile having a battery, an electric circuit connected between said battery and said combination recharging and storage housing, said electrical circuit passing through an ignition switch so that the battery recharging process can only take place when the ignition switch of the automobile is on.

* * * * *